United States Patent
Lee

(10) Patent No.: US 8,020,068 B2
(45) Date of Patent: Sep. 13, 2011

(54) MEMORY SYSTEM AND COMMAND HANDLING METHOD

(75) Inventor: Jung-Bae Lee, Gyeonggi-do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1087 days.

(21) Appl. No.: 11/779,345

(22) Filed: Jul. 18, 2007

(65) Prior Publication Data

US 2008/0195922 A1    Aug. 14, 2008

(30) Foreign Application Priority Data

Feb. 8, 2007   (KR) .................... 10-2007-0013179

(51) Int. Cl.
*H03M 13/00* (2006.01)

(52) U.S. Cl. .................... 714/758; 714/752
(58) Field of Classification Search ............... 714/752, 714/758
See application file for complete search history.

(56) References Cited

U.S. PATENT DOCUMENTS

| 5,216,672 A * | 6/1993 | Tatosian et al. ............ 714/718 |
| 6,266,737 B1 * | 7/2001 | Ware et al. ............... 711/105 |
| 2002/0013929 A1 * | 1/2002 | Maciver ................... 714/800 |
| 2004/0064660 A1 * | 4/2004 | Lyons ..................... 711/167 |
| 2004/0128602 A1 * | 7/2004 | Lyons ..................... 714/736 |
| 2004/0237018 A1 * | 11/2004 | Riley ..................... 714/753 |

FOREIGN PATENT DOCUMENTS

| JP | 05023395 | 2/1993 |
| JP | 05222495 | 8/1993 |
| KR | 1019980033007 | 7/1998 |

* cited by examiner

*Primary Examiner* — Sam Rizk
(74) *Attorney, Agent, or Firm* — Volentine & Whitt, PLLC

(57) ABSTRACT

A memory system including a memory controller and a memory and a related method are disclosed. The method includes communicating a command and error detection/correction (EDC) data associated with the command from the memory controller to the memory, decoding the command and executing an EDC operation related to the EDC data in parallel, and if the command is a write command, delaying execution of a write operation indicated by the write command until completion of the EDC operation, else immediately executing an operation indicated by the command without regard to completion of the EDC operation.

20 Claims, 12 Drawing Sheets

FIG. 9A

|      | 0    | 1  | 2   | 3 | 4  | 5  | 6   | 7 | 8   |
|------|------|----|-----|---|----|----|-----|---|-----|
| Pin0 | DC=0 | R1 | R7  | X | X  | C2 | C8  | X | CRC |
| Pin1 | CSB  | R2 | R8  | X | X  | C3 | C9  | X | CRC |
| Pin2 | /RAS | R3 | R9  | X | X  | C4 | C10 | X | CRC |
| Pin3 | /CSA | R4 | R10 | X | X  | C5 | C11 | X | CRC |
| Pin4 | /WE  | R5 | R11 | X | C0 | C6 | C12 | X | CRC |
| Pin5 | R0   | R6 | R12 | X | C1 | C7 | X   | X | CRC |

FIG. 9B

|      | 0    | 1   | 2   | 3 | 4 | 5 | 6 | 7 | 8   |
|------|------|-----|-----|---|---|---|---|---|-----|
| Pin0 | DC=1 | D6  | D12 | x | x | x | x | x | CRC |
| Pin1 | D0   | D7  | x   | x | x | x | x | x | CRC |
| Pin2 | D1   | D8  | x   | x | x | x | x | x | CRC |
| Pin3 | D2   | D9  | x   | x | x | x | x | x | CRC |
| Pin4 | D3   | D10 | x   | x | x | x | x | x | CRC |
| Pin5 | D5   | D11 | x   | x | x | x | x | x | CRC |

MEMORY SYSTEM AND COMMAND HANDLING METHOD

CROSS REFERENCE TO RELATED APPLICATION

This application claims priority to Korean Patent Application No. 10-2007-0013179 filed Feb. 8, 2007, the subject matter of which is hereby incorporated by reference.

BACKGROUND OF THE INVENTION

1. Field of the Invention

The invention relates generally to memory systems and methods of handling memory system commands.

2. Description of Related Art

The concept of a "memory system" now encompasses a great variety of circuits and related control methods enabling the transfer, storage and retrieval of digital data. Once memory systems were associated with only computers systems and similar computational logic platforms. Now, a great host of consumer products ranging from cell phones to automobiles to refrigerators include memory systems of varying complexity.

A generic memory system is conceptually illustrated in Figure (FIG.) 1, wherein a memory 2 is provided to store data received from a memory controller 1 via a channel 3.

The memory 2 may be volatile or nonvolatile in its operating nature. A volatile memory retains stored data only so long as power is applied to the memory. Dynamic Random Access Memories (DRAMs) and Static Random Access Memories (SRAMs) are well known categories of volatile memories. In contrast, nonvolatile memories have the ability to retain stored data in the absence of applied power. Flash memory is one popular example of a nonvolatile memory.

Regardless of memory type and related storage capabilities, a memory must typically be associated with some kind of memory controller. Memory controller 1 shown in FIG. 1 may take many different forms including a generic processor or controller, a direct memory address (DMA) controller, a host device central processor unit (CPU), a dedicated data switch or transfer element, etc. In all of its varied forms, and regardless of additional functionality, memory controller 1, at its basic relevant functionality, controls the transfer of data to and/or from memory 2.

Data transfer between memory controller 1 and memory 2 is accomplished via a channel 3. Channel 3 may be hardwired or wireless in its implementation. For example, data may be wirelessly transferred between memory controller 1 and memory 2 via radio frequency (RF) channel(s), infrared channel(s) and/or magneto-electric channel(s). More typically, memory controller 1 and memory 2 are connected via a hardwired channel formed by one or more buses and/or various signal lines. In this context, a "bus" is merely a collection (physical or operational) of signal lines commonly operated in relation to a block of data and/or a timing segment.

The examples shown in FIG. 2 are but several of the numerous types of hardwire channels 3 that might be used to connect memory 2 with a memory controller 1. In the first illustrated example, memory 2 and memory controller 1 are connected by a plurality of unidirectional control signal lines (C/S), a unidirectional address bus (ADDR), and a bidirectional data bus (DQ). Assuming for purposes of illustration that memory 2 is a DRAM, the control signal lines may be used to communicate commonly used control signals such as chip select (CS), row address strobe (RAS), column address strobe (CAS), write enable (WE), etc. In this configuration, the address bus may be used to communicate multiple address bits identifying unique location(s) in memory 2 to which, or from which data is to be read or written, respectively. Data written to memory 2 will hereafter be referred to a "write data" and data retrieved from memory 2 will be referred to as "read data."

In the second illustrated example of FIG. 2, the unidirectional collection of control signal lines and the address bus are effectively combined into a single control/address (C/A) bus. This bus configuration is commonly associated with memory systems using packetized commands. That is, certain memory system architectures utilize the flexibility and efficiency offered by configuring data into so-called "data packets." The definition and use of data packets are well understood by those skilled in the art and are the subject of many conventional protocols and standards.

In the third illustrated example of FIG. 2, a common unidirectional C/A bus structure is also used to communicate write data from memory controller 1 to memory 2. Here again, the write data may be grouped into one or more data packet(s) along with related control data and/or address data.

Finally, in the fourth illustrated example of FIG. 2, a common bidirectional bus is used to communicate not only control data, address data and write data from memory controller 2 to memory 1, but also read data from memory 2 to memory controller 1. Only certain control signal lines are otherwise defined between memory controller 1 and memory 2 outside the common bidirectional bus. In this example, the read data may be packetized before being communicated from memory 2 to memory controller 1.

One notable characteristic of conventional and emerging memory systems is an increasing demand for greater data bandwidth (i.e., available data per unit operation) and/or data throughput (available data per period of time). Data bandwidth may be increased by increasing the number of data bits being communicated to/from a memory in a memory system operation. Data throughput may be increased by the number of data bits being communicated to/from a memory in a memory system operation and/or increasing the speed with which each memory system operation is performed.

Given concurrent commercial motivations to reduce memory system size and power consumption while maximizing available data bandwidth and data throughput, it is not surprising that certain practical limitations have quickly arisen. For example, the number of signal lines connecting a memory controller with memory may be limited by the size of the memory or memory controller and/or the corresponding number of available connection (input/output) pads. Given such physical limitations, all or some signal lines in a memory system may be multiplexed in their use.

Regardless of the physical connections between a memory and memory controller, almost all contemporary memory systems are being run at increasingly fast clock speeds. Increasingly fast clock speeds facilitate greater data throughput. Enhanced data throughput is highly desirable for many commercial applications.

Unfortunately, increasingly fast clock speeds also increase the likelihood of data communication (transmission and/or reception) errors. Indeed, memory systems have become so complex and data transfer speeds have become so fast, that many contemporary memory systems now incorporate error detection and/or error correction (singularly or collectively indicated as "EDC") capabilities to mitigate the inevitable consequences of data errors.

EDC capabilities were once used primarily for long-haul (or bulk) data traffic such as telephone networks and satellite communication systems. Now, however, the advantages of incorporating EDC capabilities within a memory system are well appreciated. There are many different types of EDC protocols, techniques, schemes, and related circuits and software. One class of relatively simple error detection techniques are conventionally used to implement a functionality referred to as a cyclic redundancy checker (CRC). More sophisticated EDC techniques are capable of not only detecting the presence of one or more error(s) in communicated data, but also of correcting the detected error(s).

Nearly all EDC techniques are implemented by adding additional ("overhead") data bits to a block of data being communicated. That is, the data block is first run through a mathematical or logical calculation in order to produce corresponding EDC data. The EDC data is then transferred along with the data block. At the receiving end, the data block is again run through a similar mathematical/logical calculation and the resulting data compared to the received EDC data. A successful comparison indicates an error free block of data. A failed comparison indicates one or more errors in the data block. When more sophisticated EDC techniques are used, these error(s) may be corrected by further resort to the overhead data.

As the operating speed and overall complexity of memory systems has increased, the control data, address data, write data, read data, etc., communicated between a memory controller and a memory has become increasingly susceptible to errors. The potentially catastrophic effects of such errors is clear. Errant control data, address data and/or write data is particularly threatening since such data is capable of corrupting the data stored in memory.

As a result of the foregoing, many contemporary memory controllers now include specialized circuits and/or software routines capable of generating EDC data in relation to memory system operations (e.g., read/write operations). A memory connected to the memory controller incorporating EDC capabilities (e.g., hardware and/or software) must be functionally capable of segregating EDC data from other data, and thereafter using the EDC data to verify the integrity of some portion of the other data.

Additionally, the memory often includes specialized circuits and/or software routines capable of notifying the memory controller when errant data has been identified. In response to a notification from the memory, the memory controller may re-send the errant data.

Where the EDC data provided by the memory controller is enabling, the memory may additionally or alternately include error correction circuits and/or software routines capable of correcting identified error(s) in the received data. The overall power and sophistication of a memory system's EDC capabilities is a matter of design choice, but increasing some provision of EDC capabilities is being made in contemporary memory systems.

EDC capabilities are particularly beneficial in the context of memory systems using data packet communication techniques. That is, individual data packets may be defined to include corresponding EDC data along with other types of data (e.g., control data, address data, write data, etc.). The EDC data may be associated with (e.g., derived from and used to detect and/or correct errors in) any one or more of these other data types.

While EDC capabilities offer great benefits in the verification of data being communicated between a memory controller and a memory, such capabilities come at a price. The greatest price is typically imposed on the overall speed of memory system operation. EDC operations run in the memory controller, and more particularly, EDC operations run in the memory generate a data throughput bottleneck within memory systems. Thus, the contemporary memory system designer faces the competing demands of increasing data throughput, which requires the streamlining, simplifying, and expediting of memory system operations, and assuring data integrity, which requires sophisticated and relatively slow EDC operations.

SUMMARY OF THE INVENTION

In recognition of at least the above described problems, selected embodiments of the invention provide a memory system capable of ensuring data integrity with the provision of EDC capabilities while at the same time avoiding the potential for command execution bottlenecks.

According to one embodiment, the invention provides a method of operating a memory system including a memory controller and a memory. The method comprises communicating a command and error detection/correction (EDC) data associated with the command from the memory controller to the memory, decoding the command and executing an EDC operation related to the EDC data in parallel, and if the command is a write command, delaying execution of a write operation indicated by the write command until completion of the EDC operation, else immediately executing an operation indicated by the command without regard to completion of the EDC operation.

In a related embodiment, the command is communicated from the memory controller to the memory as a command packet including the EDC data, control data, and address data via a first unidirectional bus, and decoding the command comprises receiving the command packet in a packet receiver and in response generating an internal command, internal EDC data, and an internal address.

In a related embodiment, executing the EDC operation comprises; applying the internal EDC data, the internal command, and the internal address to an error detector, generating an error signal in the error detector in relation to the internal command, internal address, and the internal EDC data, and applying the error signal to a write enable signal transfer block. Delaying execution of the write operation may comprise generating a final write enable signal in the write signal transfer block responsive to the error signal.

In yet another related embodiment, the command is communicated from the memory controller to the memory as a first command packet including control data, address data, and first EDC data associated with at least one of the control data and address data, and as a second command packet including write data and second EDC data associated with the write data. Decoding the command signal comprises receiving the first command packet in a packet receiver and in response generating an internal command, an internal address, first internal EDC data, and a first packet indicating signal. Executing the EDC operation may comprise; applying the first internal EDC data, the internal command, the first packet indicating signal, and the internal address to an error detector, generating a first error signal in the error detector in relation to the internal command, the first EDC data, internal address, and the first packet indicating signal, and applying the first error signal to a write signal transfer block. Here, delaying execution of the write operation may comprise generating a final write enable signal in the write signal transfer block in relation to the first error signal.

In yet another related embodiment, decoding the command may further comprise; receiving the second command packet in the packet decoder and generating internal write data, second internal EDC data, and a second packet indicating signal, and storing the internal write data. Execution of the EDC operation may further comprise; applying the second internal EDC data, the internal write data, and the second packet indicating signal to the error detector, and generating a second error signal in the error detector in relation to the internal write data, the second internal EDC data, and the second packet indicating signal.

In another embodiment, the invention provides a memory system comprising; a memory controller connected to a memory via a channel, wherein the memory controller comprises; a command/address transmitting block generating a command and error detection/correction (EDC) data associated with the command and communicating the command and the EDC data to the memory via the channel, and wherein the memory comprises; a receiver block receiving the command and EDC data, and a decoding/execution block decoding and executing the command in parallel with executing an EDC operation related to EDC data, wherein execution of an operation indicated by the command is immediate and without regard to completion of the EDC operation unless the command is a write command, but if the command is a write command delaying the operation until completion of the EDC operation.

In another embodiment, the invention a high-speed memory system comprising; a memory controller connected to a plurality of memory elements arranged on a memory card via a collection of point-to-point interconnections, wherein the memory controller comprises a command/address transmitting block generating a command and error detection/correction (EDC) data associated with the command, and communicating the command and the EDC data to at least one memory associated with the one of the plurality of memory element via at least one of the interconnections, and wherein the memory comprises; a receiver block receiving the command and EDC data; and a decoding/execution block decoding and executing the command in parallel with executing an EDC operation related to EDC data, wherein execution of an operation indicated by the command is immediate and without regard to completion of the EDC operation unless the command is a write command, but if the command is a write command the operation is delayed until completion of the EDC operation.

At least one of the plurality of memory elements in this regard may comprise a vertically stacked arrangement of memories including the memory. The stacked arrangement of memories may also include a lowermost memory configured to re-drive the command and the EDC data to another memory in the stacked arrangement of memories.

BRIEF DESCRIPTION OF THE DRAWINGS

Embodiments of the invention are described in relation to the accompanying drawings. Throughout the drawings like reference numbers indicate like exemplary elements, components, and steps. In the drawings:

FIGS. 9A and 9B are conceptual diagrams of possible related data packets useful in the implementation of a method or system consistent with an embodiment of the invention;

DESCRIPTION OF EXEMPLARY EMBODIMENTS

Figure 1:
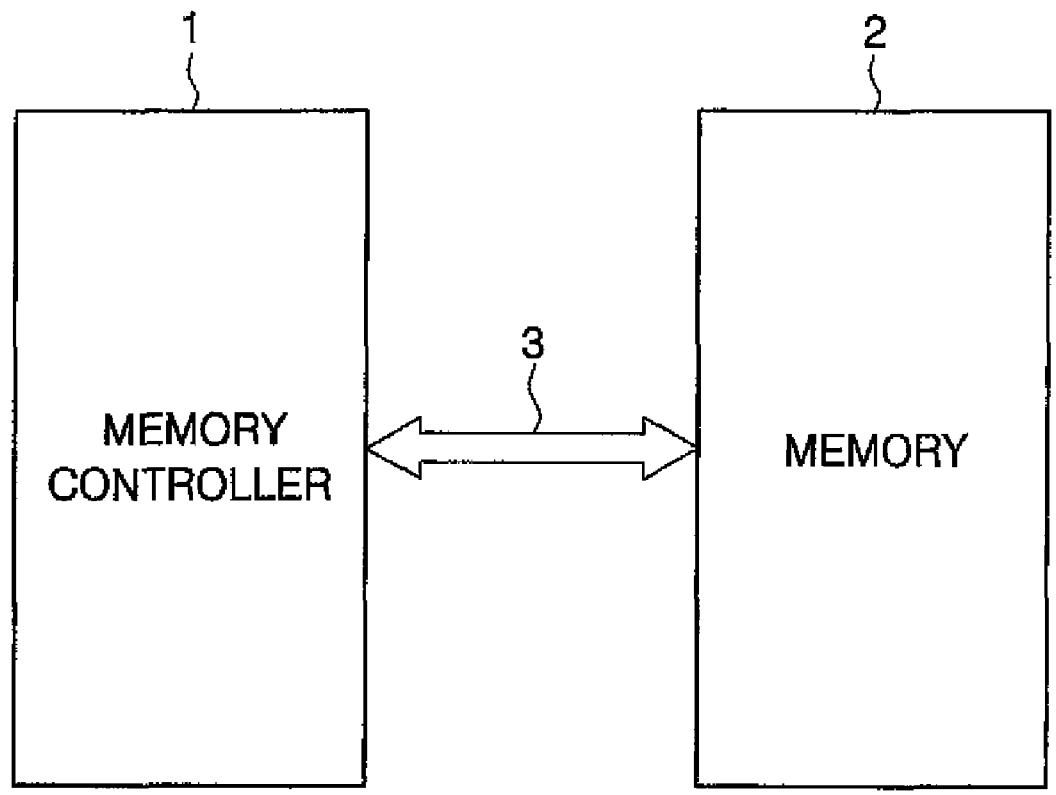
FIG. 1 is a block diagram of a conventional memory system.
Figure 2:
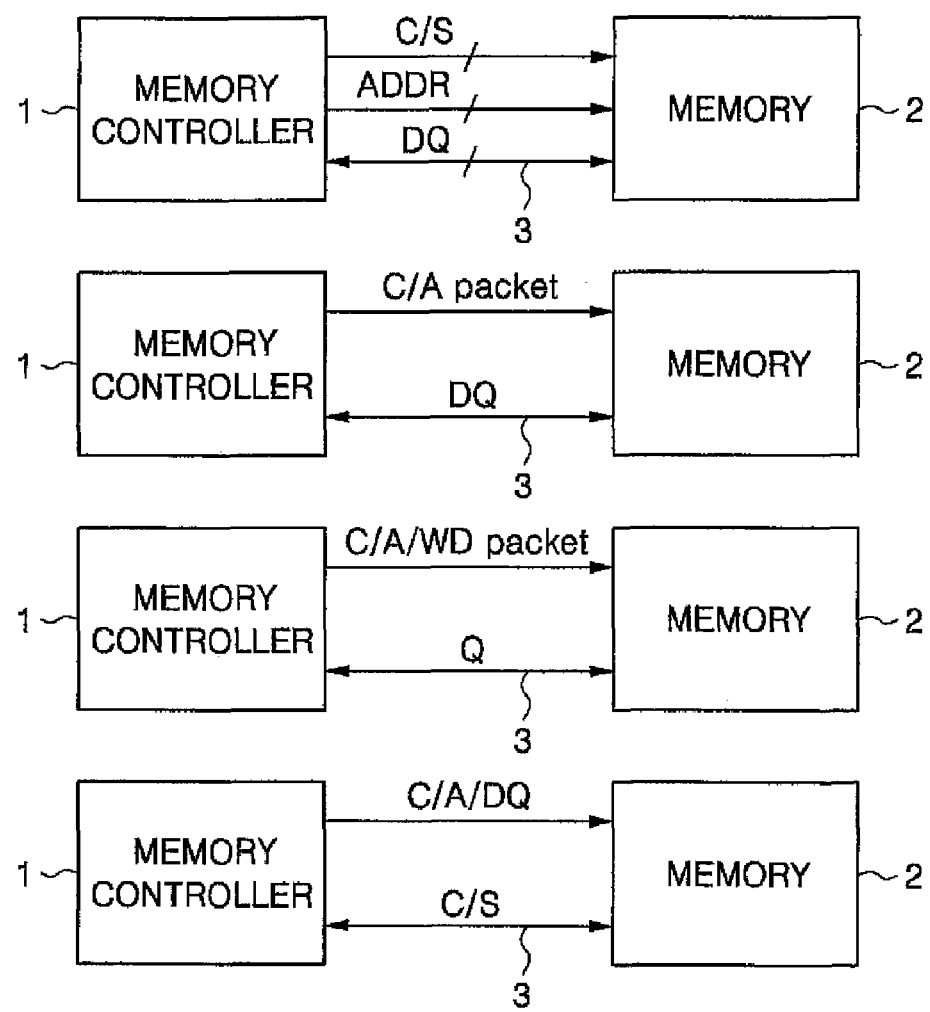
FIG. 2 is a collection of further examples of conventional memory systems and possible channel connection types between a memory controller and memory.

Embodiments of the invention will now be described with reference to the accompanying drawings. The invention may, however, be alternately and variously embodied and is not limited to only the illustrated embodiments. Rather, the illustrated embodiments are presented as teaching examples. The actual scope of the invention is defined by the claims that follow.

In one aspect, embodiments of the invention address the issue of increasing command execution latency within a memory system incorporating EDC capabilities. Conventional memory systems sequentially execute commands only after finishing a corresponding EDC operation. When EDC data is communicated from a memory controller to a memory in relation to a command, an EDC operation must be performed to verify the accuracy of the data associated with the command (e.g., control data, address data, etc.) before the command can be executed in the memory. This sequential execution of the EDC operation followed by the command operation ensures that the data received in relation to the command is accurate before the command is actually executed.

This straight-forward sequential approach to command data verification followed by execution of the command ensures accuracy. It is also likely to create a command execution bottleneck in the memory. For example, if transient noise is apparent on a channel connecting the memory controller and memory, a group of commands sequentially received by the memory may include noise-induced data errors. The EDC operations used to identify and/or correct these errors may be relatively lengthy in their respective or cumulative execution. Since the memory system operations indicated by the group of commands can only be sequentially executed following EDC verification, conventional memory systems may bog down in a sequence of relatively slow EDC operations. As a result, data throughput in the conventional memory system may be markedly reduced.

However, embodiments of the invention recognize practical execution distinctions between types of memory system operations. Without loss of generality, embodiments of the invention recognize a clear distinction between "write operations" and "non-write operations." For purposes of this description, a "write operation" is any operation that has the intended capability of altering one or more data value(s) in memory. This definition is broader than the customary use of the phrase "write operation" as used in the context of conventional RAM devices, for example. It also includes "program operations" as used in the context of conventional flash memory devices. Clearly, these types of conventional operations—which are specifically ascribed to the alteration of data stored in memory—are subsumed within the working definition of a "write operation." However, other operations are also included within this definition. For example, erase operations performed in many kinds of nonvolatile memories are also intentionally capable of altering one or more data value(s) in memory, and as such, fall within the working definition of a write operation.

In contrast, other memory system operations, hereafter individually and collectively referred to as "non-write operations," are not intentionally capable of altering one or more data value(s) in memory. Conventional read operations applied to both volatile and nonvolatile memories are examples of a non-write operation, since their execution is not intended to alter any data value stored in memory. So too, refresh operations applied to conventional memories are another example of a non-write operation, as are conventional chip select operations, etc.

In the description that follows, each operation, whether a write operation or a non-write operation, is assumed to be associated with one or more commands. Some operations in certain memory systems may be executed in response to a single command indicated by a unitary block of command data. Other operations may be executed in response to multiple commands indicated over a sequence or collection of data blocks containing command data. For purposes of clarity throughout this description, this distinction between the execution details of various commands will not be further referenced, and each memory system operation is said to be performed in response to "a command", recognizing that said command may involve many different data configurations and/or data timing characteristics. Thus, in view of the foregoing, a write operation will be said to be executed in a memory in response to a "write command," and a non-write operation will be said to be executed in a memory in response to a "non-write command."

Commands and data associated with commands may be variously "communicated" within the context of embodiments of the invention between a memory controller and a memory. Such communication may be wireless and/or hardwired in its nature. Both standard and customized data communication protocols are contemplated by embodiments of the invention.

Commands and related memory system data (e.g., address data, write data, read data, etc.) may be communicated between a memory controller and a memory in a data packet or in some other non-packet form (i.e., using conventional serial or parallel data communication techniques). Data packets may be variously defined in their structure and communication timing. Embodiments of the invention contemplate both standard and customize data packet definitions. Thus, while certain embodiments of the invention have particular application and benefit to memory systems using packetized data, the subject invention is not limited to only such systems.

Commands, whether packetized or un-packetized, must be "decoded" within a memory before (or as part of) being executed using memory-based resources (e.g., hardware and/or software resources available to the memory). Packet decoding is a well understood concept. Since one common purpose for packetizing data is the multiplexing of corresponding signals lines, some partitioning and subsequent decoding of the data bits contained in a data packet are required. However, the term "decoding" as used in this description has a broader definition and subsumes all forms of digital data and/or analog signal interpretation and/or conversion.

In many instances, memory system data and/or signals may be identified as internal verses external for purposes of description. Internal data, internal address, internal command, etc., means data operable or meaningful within a memory of the memory system. For example, in practical applications, memory controllers manufactured by a number of vendors are used in memory systems in conjunction with memories manufactured by different vendors. It is common for various memory controller commands to be "decoded" into internal commands executable within a memory. Sometimes the format and definition of external and internal commands or external and internal data may be identical. However, some decoding, conversion or interpretation of a command or data received from a memory controller may be performed by a memory. This is also true of certain control signals, such as clock signals. However, data/clock timing conversions, data type conversions, signal level conversions, command interpretations and decoding, etc. between the memory controller and memory are deemed to be conventional in nature and will vary by memory system design.

Once a command and any related data has been received in memory, successfully identified by decoding, and verified by an applied EDC operation it may be executed using hardware and/or software resources in memory. The actual execution of commands in a particular memory system is a matter of design choice and is also deemed conventional for purposes of this description.

In the illustrated embodiments that follow, a generic memory core is indicated as a primary hardware resource for storing data in a memory. While DRAM examples have been selected to illustrate various embodiments of the invention, those of ordinary skill in the art will recognize that other memory types might be used, such as a SRAM, or a flash (NAND or NOR) memory. For the sake of clarity, conventional memory core operations will be assumed in order to avoid repetition of extraneous and conventionally understood detail related to the actual mechanisms whereby data storage (writing or programming) and data retrieval (reading) are accomplished. Thus, row and column addressing techniques, applied word line and bit line voltages, applied sequences of data operations, applied sequences of signal line and control signals, etc., will vary with the specific type and design of particular memory cores.

Embodiments of the invention also recognize that memory cores are commonly associated with a number of related circuits, such as decoders, voltage generators, redundant memory circuits, etc. These conventionally associated peripheral circuits are largely omitted from the illustrated embodiments that follow, since their design, use and incorporation within the embodiments is deemed to be conventionally understood.

Figure 3:
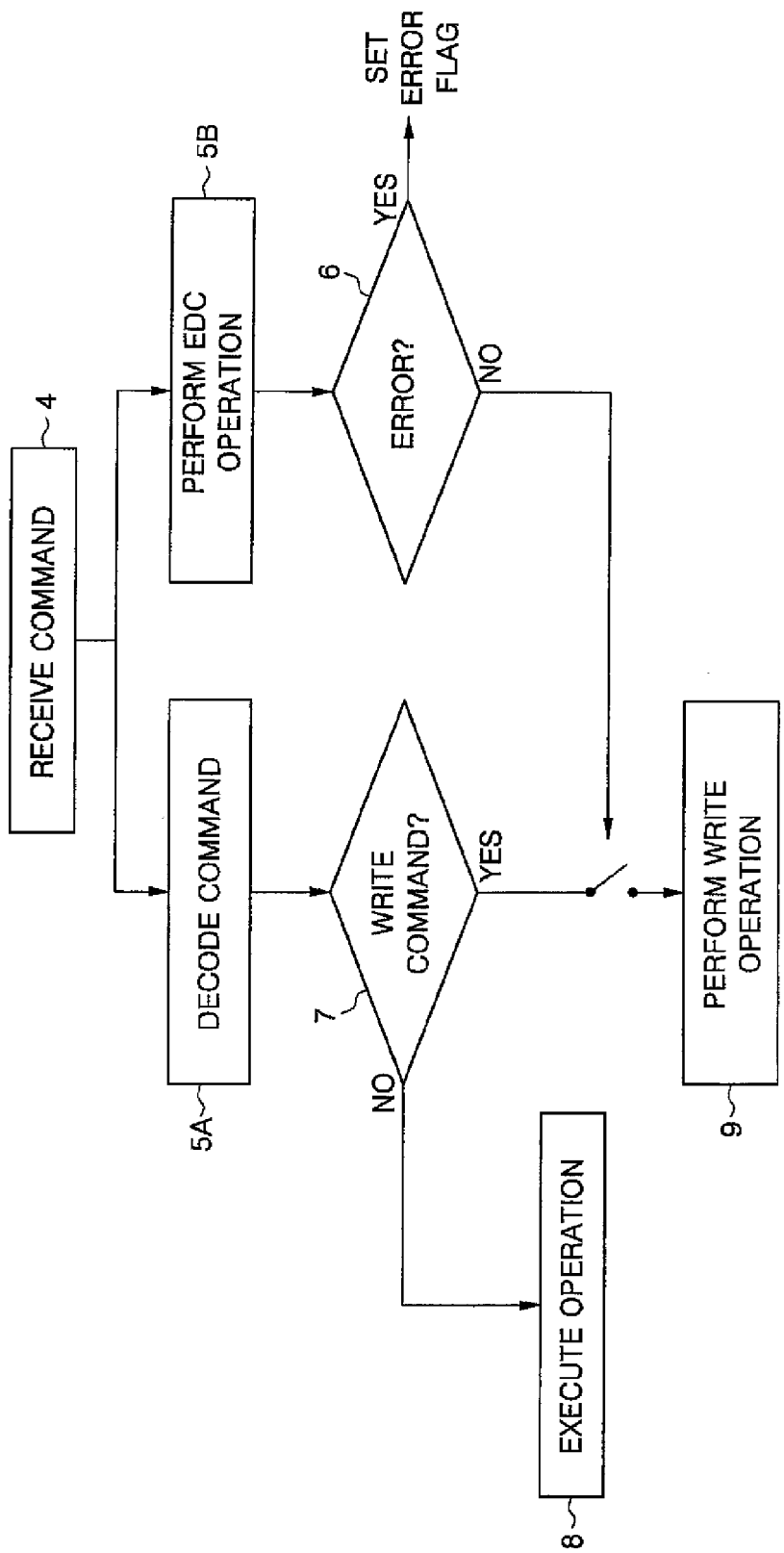
FIG. 3 is a flowchart summarizing certain aspects of method embodiments of the invention.

In recognizing the distinct operating implications between write operations and non-write operations, certain method embodiments of the invention may be summarized by the flowchart of FIG. 3. In this flowchart, it is assumed that a memory controller has communicated a memory system command along with related data including EDC data to a memory. Upon receiving the command (4), the memory begins execution of a decoding operation (5A) and an EDC operation (5B) in parallel. In this context, the phrase "in parallel" means simultaneously performed or overlapping execution in any part. Ideally, the decoding operation and EDC operation would begin simultaneously and run substantially in parallel until the faster of the two operations was complete. However, different signal line lengths between a decoder circuit executing the decoding operation and an EDC circuit executing the EDC operation, as well as real-world execution variations between individual circuit implementations may result in some asymmetry of execution between these two operations. Nonetheless, any degree of coincident execution between these two operations is said to be "in parallel."

Unlike the conventional approach which waits to decode and execute an operation until after it has been verified by a corresponding EDC operation, embodiments of the invention begin the decoding and potential execution of a received command while the EDC operation is being performed. The initial decoding of the received command (5A) will identify the command as either a write command or a non-write command (7). If the received command is a non-write command it is immediately executed without any consideration of the outcome of the EDC operation (5B). In this context the term "immediately" has specific reference to the EDC operation and its completion. It does not necessarily indicate a temporal immediacy other than the practical effect that execution of a non-write operation does not necessarily require some prior positive indication of EDC compliance (e.g., an EDC verification gating function).

In contrast, where the initial decoding (5A) indicates that the received command is a write command, execution of the write command is not "immediate." Rather, execution of the write operation (9) indicated by the write command is contingent upon (e.g., is gated by) a positive indication resulting from execution of the corresponding EDC operation. Thus, the write command is executed only after the command and its related data have been verified as being error free, or after any detected error(s) have been corrected.

As noted above, conventional EDC operations vary in their complexity, sophistication, and application. In some embodiments, only a simple CRC or similar check-sum procedure may be run to verify the correctness of a received command. Indication of an error by the EDC operation may in some embodiments result in no other memory-based activity other than the setting of an error flag and disregard of the errant command. In such embodiments, the error flag may result in memory controller-based activity, such as re-transmission of the command at a reduced clock frequency, error detection and correction, etc.

In still other embodiments, the memory may implement highly sophisticated error correction procedures capable of correcting one or more errors contained in the command and its related data. However, even where the memory has inherent error correction capabilities, an error indication (such as an error flag) is typically communicated from the memory to the memory controller so that the memory controller may make adjustments, where applicable, to subsequent communications or the development of command data.

In this manner, non-write operations may be immediately executed without delay associated with waiting for the EDC operation to finish. Because non-write operations do not intentionally alter one or more data values stored in memory, their potentially erroneous execution is less critical to the continuing operation of the memory system. For example, if an error in a read address data associated with a read operation causes the wrong data to be read from memory, such data may be discarded by the memory controller and the read operation reinitiated. While such read re-try operations delay the overall operation of the memory system, they do not corrupt the data stored in memory.

However, since write operations do have the potential for corrupting stored data, their execution is conditioned upon a positive indication by a corresponding EDC operation. Thus, only EDC operations attributed to write operations are capable of delaying memory throughout. As a result, the likelihood of developing memory-based execution bottlenecks is reduced while also ensuring the integrity of stored data.

Figure 4:
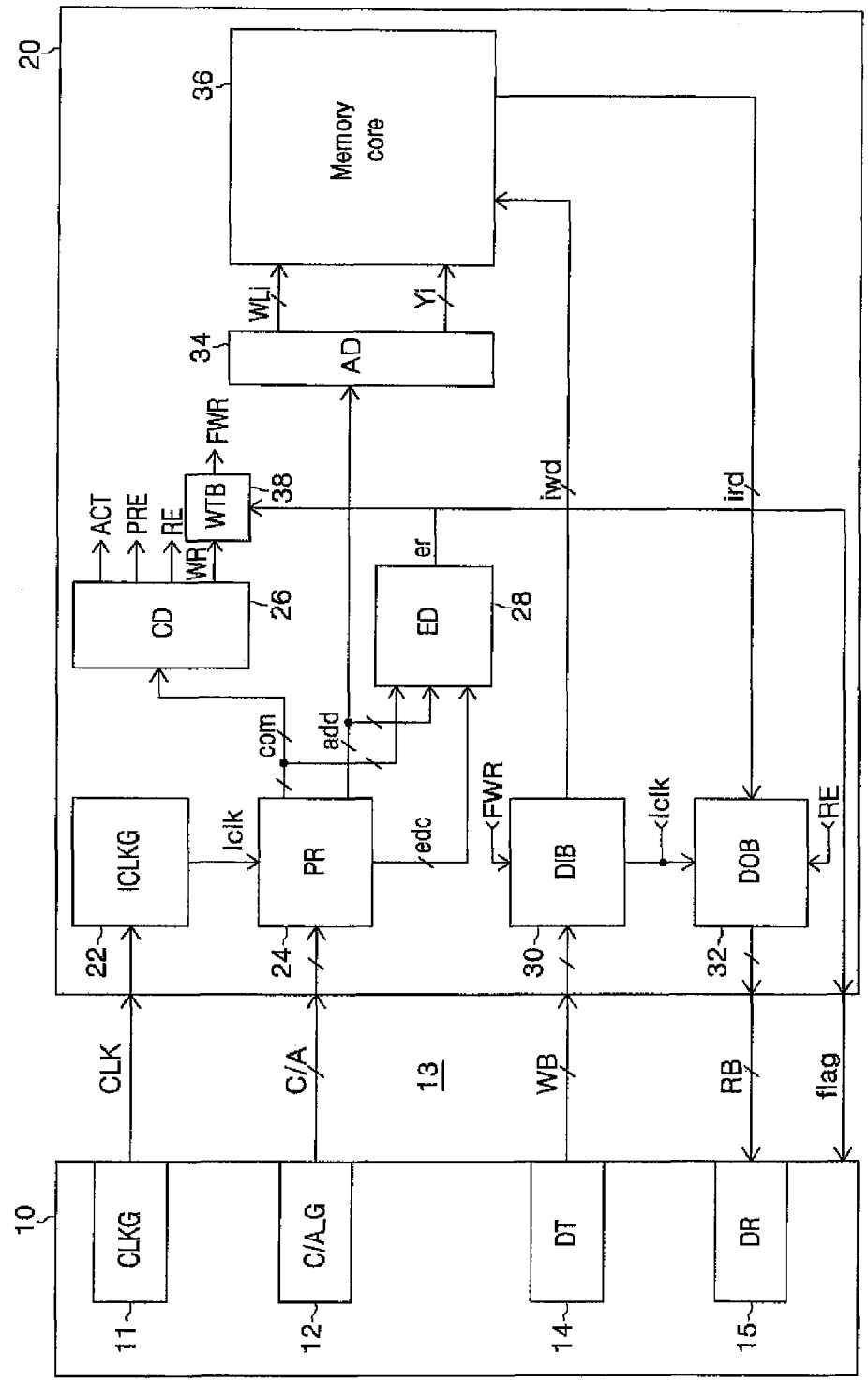
FIG. 4 is a block diagram of a memory system according to one embodiment of the invention.

One embodiment of a memory system operating in accordance with the present invention is illustrated in FIG. 4. Here, memory controller 10 is connected via a hardwired channel 13 to a memory 20. Memory 20 is assumed to be a DRAM in the illustrated example, but it might alternately be another form of volatile memory (e.g., an SRAM), a nonvolatile memory (e.g., a flash memory), or a memory having mixed volatile and nonvolatile components (e.g., a nonvolatile core memory associated with volatile memory caches, intermediate memories and/or temporary buffers).

In the illustrated example of FIG. 4, memory controller 10 includes a clock generator (CLKG) generating an external clock signal (CLK) and applying the external clock signal (CLK) to memory 20 via a dedicated signal line. While common, particularly in synchronous memory systems, the application of an external clock to memory 20 is not required, and an internal clock (Iclk) driving the operation of circuits within memory 20 may be internally generated. Alternately, memory 20 may generate the necessary internal clock signal(s) in response to an external signal originating from one or more sources other than the memory controller.

Memory controller 10 also includes a command and address packet generator 12 (C/A_G). Thus, at least command and address communications between memory controller 10 and memory 20 in the illustrated example of FIG. 4, are assumed to be transmitted in packet form. The definition and generation of data packets for multiple purposes is deemed to be conventional and no additional detail regarding the specific nature and design of C/A packet generator 12 will be given in this description. The C/A packet generated by C/A generator 12 is communicated to memory 20 via a unidirectional C/A bus in the illustrated embodiment.

Memory controller 10 also includes a data transmitter 14 and a data receiver 15, both of conventional design. Data transmitter 14 generates write data for communication to memory 20. In the illustrated example, the write data is communicated via a unidirectional bus write bus (WB). Write data is data to be stored in memory 20 in response to a write operation indicated by a command from memory controller 10. In the illustrated example, write data will typically be communicated to memory 20 in parallel with a corresponding write command, but it may be communicated before or after the communication of the corresponding write command by memory controller 10.

Data receiver 15 receives read data from memory 20. Read data is data retrieved from memory 20 in response to a read command communicated by memory controller 10. Read data is communicated from memory 20 to memory controller 10 via a unidirectional read bus (RB).

Thus, in the illustrated example of FIG. 4, channel 13 includes a clock signal line, a first unidirectional C/A bus, a second unidirectional write bus, and a third unidirectional read bus. Additionally, a dedicated error signal line may be used to communicate the detection of an error from memory 20 to memory controller 10. The use of separate unidirectional buses has several performance advantages including a reduced need to arbitrate bus conflicts. Additionally, the bus widths (i.e., the number of constituent signal lines forming each bus) between the first, second and third buses may be optimized. Thus, the corresponding first, second, and third bus widths may be the same or different. For example, different bus widths may be used for write and read operations in order to achieve maximum data transfer efficiencies. See, for example, published U.S. Patent Application 2002/0023191 published Feb. 21, 2002, the subject matter of which is hereby incorporated by reference.

Memory 20 in the illustrated example of FIG. 4 includes an internal clock generator (ICLKG) 22 receiving the external clock signal (CLK) and generating at least one internal clock signal (Iclk). The one or more internal clock signals generated by internal clock generator 11 are applied to various circuits within memory 20. For example, in the illustrated synchronous DRAM example of FIG. 4, an internal clock signal (Iclk) is applied to packet receiver (PR) 24 as well as internal read/write data buffers 30 and 32. As with the external clock generator 11 in memory controller 10, the design of internal clock generator 22 is deemed conventional in nature.

Packet receiver 24 may also be conventional in its design and operation. Packet receiver 24 receives the C/A packet communicated via the C/A bus from memory controller 10 and thereafter decodes the data contained in the C/A packet. In this context, decoding may be as simple as segregating packet data bits into their constituent components (e.g., address data from command data, from EDC data, etc.). Alternately or additionally, packet receiver 24 may decode and convert the externally applied packet data into internally compatible data. Such conversion may be as simple transitioning signal levels or re-timing data bits, or it may involve a full external-to-internal code conversion involving look-up tables and/or execution of data conversion algorithms. Regardless of the level of computational or operational complexity, in the illustrated example of FIG. 4, packet receiver 24 is said to derive an internal command (com), internal address (add), and internal EDC data (edc) from the incoming command.

It should be noted that the concept of a packet receiver is drawn to the illustrated example which assumes the packetized communication of data between memory controller 10 and memory 20. In non-packet memory systems, a more generic "receiver block" may be used to receive and decode the command.

It should further be noted in this context that the internal EDC data may be derived in relation to the internal command and/or the internal address. Thus, the subsequently performed EDC operation(s) may be applied to only the data indicating the internal command, only the data indicating the internal address, or both the command and address data taken collectively as a single data block or as separate data blocks. Thus, in the illustrated example, error detector (ED) 28 receives the internal command, internal address and internal EDC data. After performing a defined EDC operation using the received data, error detector 28 generates an error signal (er) indicating the presence or absence of an error in the received C/A data packet.

In this descriptive context, the term "error detector" has been used to indicate a competent error detector, such as one implementing a CRC technique. However, this term should not be construed as being somehow limited to only error detection circuits or similar capabilities. Rather, such circuits may also incorporate error correction capabilities of varying degrees of sophistication.

The internal address is also applied to a conventional address decoder (AD) 34 operationally configured with a conventional DRAM memory core 36. Address decoder 34 may be used to generate the word line (WLi) and bits line (Yi) signals implementing various operations within memory core 36.

The internal command is also applied to a command decoder (CD) 26 within memory 20. Command decoder 26 may be conventional in its design and operation. In the illustrated example of FIG. 4, a multi-bit internal command is generated by packet receiver 24 and applied to command decoder 26. In response to the internal command, command decoder 26 generates a plurality of memory control signals. Naturally, the number and nature of the control signals generated by command decoder 26 will vary with the nature and type of memory core being used, as well as its related peripheral circuits. In the illustrated example of FIG. 4, conventional DRAM control signals such as chip activation (ACT), precharge (PRE), refresh (RE) and write enable (WE), etc., are generated by command decoder 26. With the exception of the write enable signal, these control signals may be conventionally applied to memory core 36 and its related peripheral circuits.

However, application of the write enable signal to circuits executing a write operation in memory 20 must take into account the EDC verification operation being performed by error detector 28. That is, the application of one or more control signals initiating a write operation in memory 20 is gated by some indication from error detection block 28 that the data associated with the internal write command and/or internal address are valid (i.e., do not contain an uncorrected error). In this context, the term "write enable signal" is not limited to only a single signal indication. Rather, embodiments of the invention recognize that one or more control signals (or data values) taken singularly or in combination may be used to initiate a write operation. Hence, such control signal(s), as applied in any format or combination, will be termed "a write enable signal" for simplicity of usage.

This functional relationship between application of a write enable signal and some EDC-related indication of valid data related to write operation data may be accomplished in a number of ways. For example, a software routine executed on a memory-resident controller or similar control logic may be used to delay application of the write enable signal until a positive indication from another routine implementing the EDC operation has been received. Alternatively, the gating of the write enable signal may be accomplished using a number of different circuits.

In the illustrated example of FIG. 4, a write enable signal transfer block 38 is used to gate application of the write signal generated by command decoder 26 to memory core 36 and its related circuits.

Figure 5:
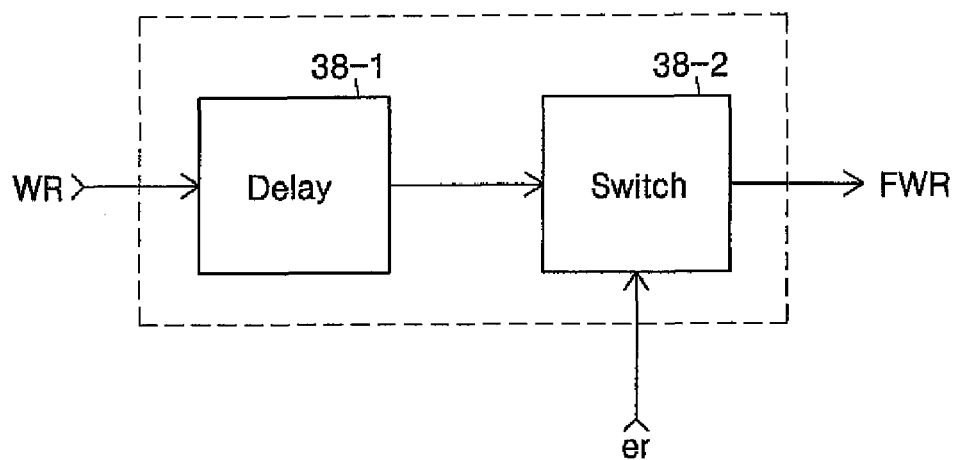
FIG. 5 is a diagram illustrating one exemplary circuit capable of implementing the write transfer block shown in FIG. 4.

FIG. 5 shows write enable signal transfer block 38 in some additional detail. The write enable signal (WR) generated by command decoder 26 is received in a delay element 38-1, such as a flip-flop or latch circuit. The output of delay element 38-1 is applied to a switch element 38-2, such as a gated flip-flop circuit. This signal is then output from switch element 38-2 upon application of an error signal (er) generated by error detector 28 as a final write enable signal (FWR). The final write enable signal (FWR) controls execution of the write operation in memory core 36 and its related circuits. Those skilled in the art will recognize that there are many different circuits that might be used to implement an error indication gating function applied to a write enable signal applied to a memory core.

Figure 6:
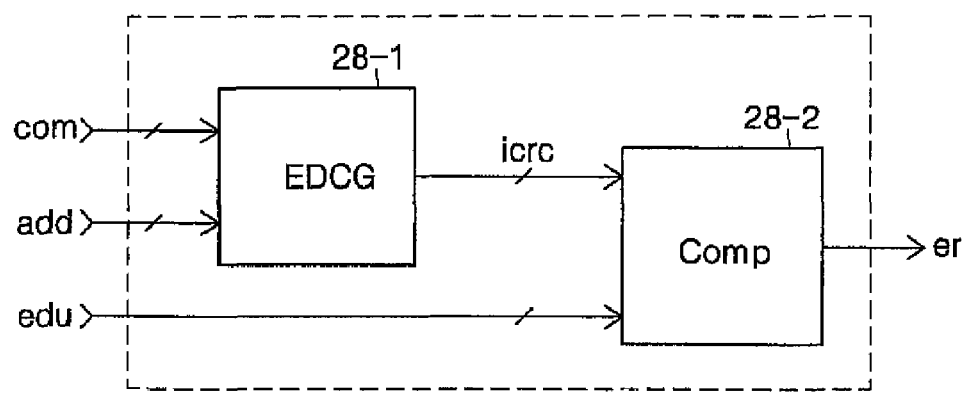
FIG. 6 is a diagram illustrating one exemplary circuit capable of implementing the error detector shown in FIG. 4.

As previously noted, the error signal (er) generated by error detector 28 may be the product of many different error detection and/or error correction algorithms, circuits, and/or protocols. One simple example of a circuit capable of generating an error signal (er) is illustrated in FIG. 6. Here, error detector 28 is shown in some additional detail. Error detector 28 comprises a conventional EDC generator 28-1 capable of implementing a CRC algorithm. In the illustrated example, EDC generator 28-1 receives both the internal command and the internal address and generates internal CRC data (icrc) in relation to the received data. The internal CRC data (icrc) is then compared to the EDC data (e.g., external CRC data calculated by memory controller 10 and communicated to memory 20 within the command packet) provided from packet receiver 24 in a conventional comparator circuit 28-2. A successful comparison of these two data sets results in a positive (no error) indication from error detector block 28. An unsuccessful comparison of these two data sets results in a negative (error) indication from error detector block 28. In one embodiment, the error signal (er) generated by error detector 28 may be a simple logic signal (e.g., a flag value) providing either the negative or positive indications.

The presence of one or more errors in a command packet communicated to memory 20 is usually of considerable interest to the corresponding memory controller 10. Errors are most commonly introduced into a data packet by noise effecting channel 13. However, many other possible sources of data bit errors are possible. Many contemporary memory controllers include adaptive capabilities that may be called upon to improve data communications accuracy. For example, in response to an error indication from memory 20, memory controller 10 may boost its signal transmission strength to mitigate noise effects in channel 13. Memory controller 20 might also or alternately reduce its data transmission rate, or begin use of a more robust error detection and correction technique. Alternately, memory controller 20 might simply re-send an errant command, or re-send it at a higher transmission strength and/or slower transmission rate. Thus, memory 20 will typically (but not necessarily) communicate "an error flag" to memory controller 10 when an error indication is generated by error detector 28. In this context, the error flag may take one of many different forms, but in the illustrated example of FIG. 4, a simple binary data signal is communicated via a dedicated error flag signal line from memory 20 to memory controller 10. The flag signal may be routinely polled by memory controller 10 following communication of a command packet.

In the illustrated example of FIG. 4, memory 20 also includes write data buffer (DIB) 30 receiving write data from the unidirectional write bus (WB). Received write data is held in write data buffer 30 until being transferred to memory core 36 and its related circuits. In the illustrated example, the write data from memory controller 10 is output to memory core 36 as internal write data (iwd) in response to an applied internal clock (Iclk) and final write enable signal (FWR).

Memory 20 also includes read data buffer (D0B) 32 receiving read data (ird) from memory core 36. Received read data is held in read data buffer 32 until being transferred to memory controller 10 via unidirectional read bus (RB). In the illustrated example, the read data retrieved from memory core 36 is output to memory controller 10 in response to an applied internal clock (Iclk) and a read enable signal (RE) generated by command decoder 26. In some embodiments, the read data provided from memory 20 to memory controller 10 will include one or more read clock signals usefully applied to data receiver 15 in memory controller 10.

Figure 7:
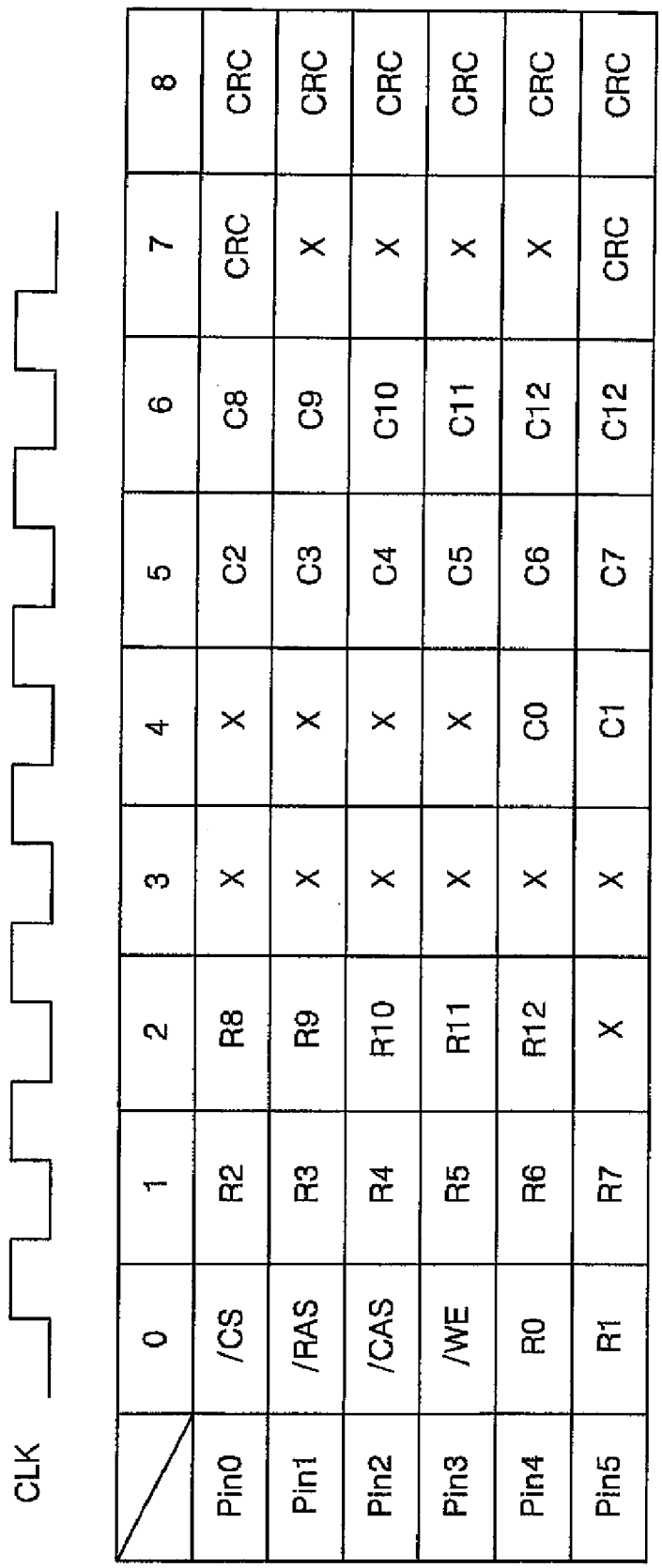
FIG. 7 is a conceptual diagram of a possible data packet useful in the implementation of a method or system consistent with an embodiment of the invention.

FIG. 7 illustrates one possible data packet that might be used in an embodiment of the invention. In a memory system providing hardwire connections between a memory controller and a memory, data packets may be conventionally defined as a group of data bits to be communicated via multiple signal lines during a sequence of timing intervals. The period of the external clock signal (CLK) generated by clock generator 11 of memory 10 may be used to define these timing intervals. In the illustrated example, six (6) signal lines connected to corresponding output pins of memory controller 10 are used during nine (9) successive timing intervals to communicate a command packet containing up to fifty-four (54) data bits. The exemplary data packet includes control data (e.g., /CS, /RAS, /CAS, and /WE), address data (e.g., R0-R12 and C0-C12), certain don't care data ("X") and EDC data related to the control and address data (e.g., 8-bit CRC data).

When this data packet is received by packet receiver 24, the various data bits may be stripped from the packet, converted or interpreted (if necessary), and then communicated to other circuits in memory 20. The illustrated example is just one of many data packet definitions that might be used in an embodiment of the invention. The definition of the data packets being exchanged between memory controller 10 and memory 20 will vary with channel types, operating speed, memory density, and similar design features of the memory system. Of particular note, the EDC capability for the illustrated memory system is limited to a simple CRC protocol, but much more sophisticated error detection/correction protocols might be used. Such protocols will, of course, impact the nature and quantity of EDC data being communicated with the command packet.

The foregoing embodiments have been presented in a description that highlights certain functions and capabilities apparent in memory controller 10 and memory 20. The individual circuits identified in the foregoing embodiments in relation to these functions and capabilities should not be construed in an overly literal sense. Those of ordinary skill in the art will recognize that the functions and capabilities may be implemented in a great variety of different circuit combinations. So combinations and/or partitions of exemplary circuits discussed above may be made. Alternately, software may be used to implement one or more of these functions and capabilities. Whether implemented in hardware and/or software, and whether implementing a packetized or non-packetized data communication arrangement, the memory may be generally said to include a decoding/execution block capable of receiving a memory system command, decoding the command, and executing the command in relation to one or more constituent memory cores.

Indeed, one or more controller(s), microprocessor(s), or Application Specific Integrated Circuits (ASICs) and related software may be used to implement the functions and capabilities ascribed to one or more of the circuits described above in the context of FIG. 4. For example, the functionality of command decoder 26 and error detector 28 may be combined in a single computational platform controlled by software. Packet receiver 24 may subsume the functionality of internal clock generator 22 and/or error detector 28 and/or command decoder 26. Write data buffer 30 and read data buffer 32 might be implemented in a single integrated memory circuit. In sum, specific circuit definition(s) will follow from overall memory system design and data packet definition.

Figure 8:
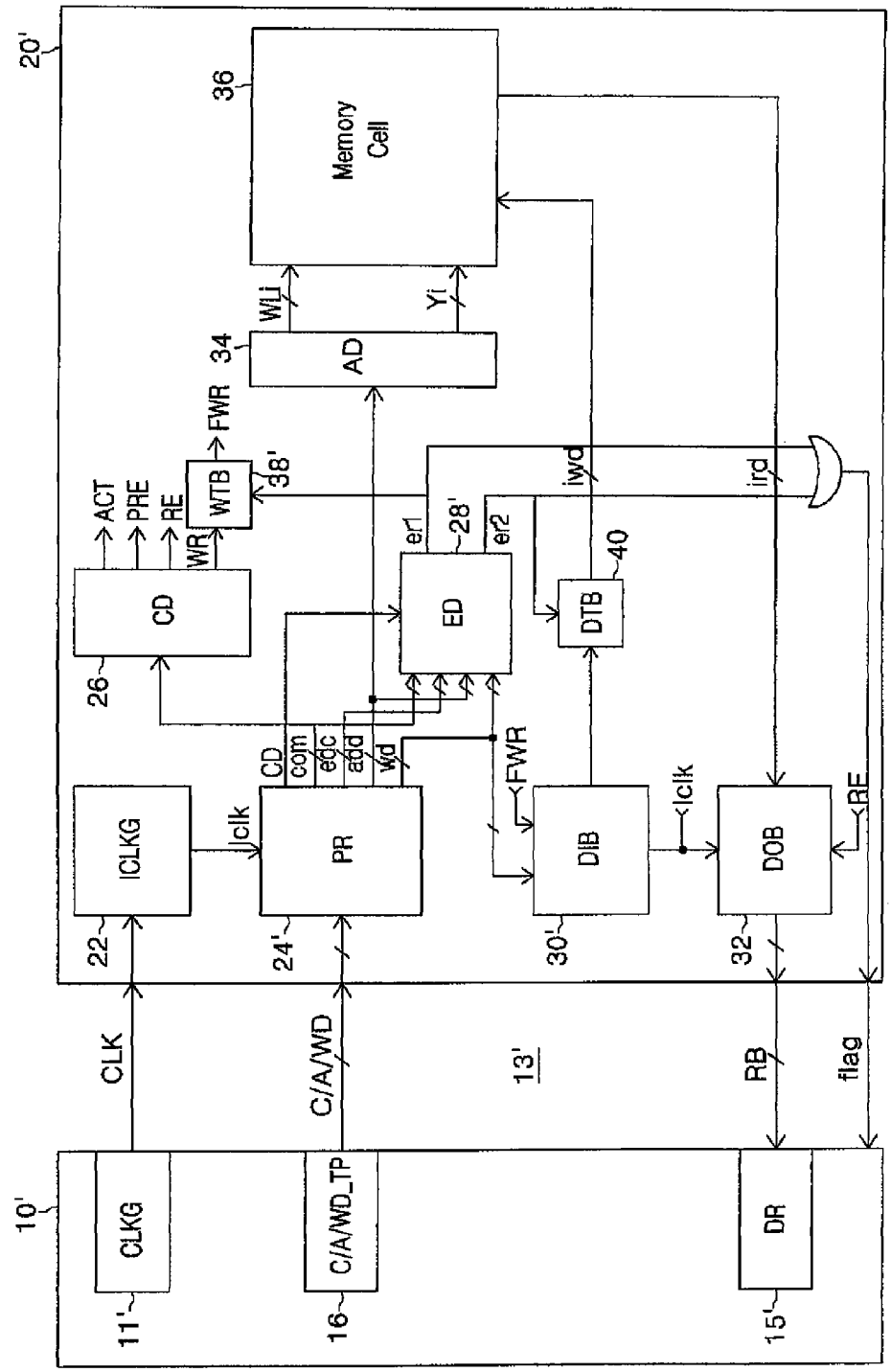
FIG. 8 is a block diagram of a memory system according to another embodiment of the invention.

As an additional example, the embodiment of FIG. 8 is presented. This embodiment is quite similar to that of FIG. 4 and the description of like components and functionality will not be reiterated. Instead focusing on the differences between the embodiments, memory controller 10' combines the functionality of command and address packet generator 12 (C/A_G) and data transmitter 14 of FIG. 4 into a single command/address/write data generator 16 (C/A/WD_G). C/A/WD generator 16 is connected to memory 20' via a single unidirectional bus. The combination of write data associated with write commands in command packets communicated from memory controller 10' to memory 20' via this single unidirectional bus has several advantages, including a simplified channel 13' and reduced data handling complexity at memory 20'.

In addition to possible changes in the structure of channel 13', the embodiment of FIG. 8 will also impact the definition of the data packets communicated between memory controller 10' and memory 20'. That is, the number of signal lines connecting memory controller 10' to memory 20' as well as the number of packet timing intervals must be considered in relation to the quantity of data related to each command.

For example, if we assumed the same channel resources and time frame availability for the memory system of FIG. 8 as were assumed for the memory system of FIG. 4, and thereby assume a similar data packet definition, it may become necessary to communicate a command in the memory system of FIG. 8 using multiple data packets. This possibility is further illustrated in FIGS. 9A and 9B. Here, related first and second data packets are separately communicated during different time frames in order to fully implement a memory system command from memory controller 10' to memory 20'. The first data packet shown in FIG. 9A includes control data (e.g., /CS, /RAS, /CAS, and /WE), address data (e.g., R0-R12 and C0-C12), don't care data ("X") and first EDC data related to the control and address data (e.g., 5-bit CRC data). The second data packet shown in FIG. 9B includes write data (e.g., D0-D12), don't dare data ("X") and second EDC data related to the write data (e.g., 5-bit CRC data).

Each of the first and second data packets indicates its nature by also including a first transmitted data/command bit (DC). This bit identifies the data packet as either containing command/address data or containing write data. In response to the data/command bit, packet receiver 24' in memory 20' knows how to handle the constituent data. For example, in the embodiment of FIG. 8, packet receiver 24' is assumed to sequentially receive the first and second data packets illustrated in FIGS. 9A and 9B. In response to the data/command bit apparent in the first packet, packet receiver 24' generates a first packet indicating signal (idc) and applies this signal to error detector 28'. By means of the first packet indicating signal (idc), error detector 28' is able to identify the first EDC data related to the command/address data and execute a defined EDC operation.

When packet receiver 24' receives the first data packet it generates an internal command (com), an internal address (add), and first EDC data (edc) in addition to first packet indicating signal (idc). In response to these various data signals, error detector 28' executes an EDC operation and generates a first error signal (er1) related to the command/address data. Command decoder 26' and write enable signal transfer block 38' then operates in response to the first error signal (er1).

Subsequently (or previously), when packet receiver 24' receives the second data packet it generates internal write data (wd) and second EDC data (edc) in addition to a second packet indicating signal (idc). The internal write data (wd) is communicated from packet receiver 24' to a write data buffer 30' (DB) where it is temporarily stored. In response to the second EDC data (edc), error detector 28' executes a defined EDC operation and generates a second error signal (er2) related to the write data. The second error signal (er2) is applied to a write data transfer block 40 (DTB) that controls the transfer of internal write data (wd) from write data buffer 30' to memory core 36' and its related circuits. In this manner, only EDC verified write data may be stored in memory core 36' as part of a write operation.

In the illustrated example of FIG. 8, the first and second error signals (er1 and er2) are applied to an OR logic circuit to generate the error flag signal communicated back to memory controller 10'. Thus, a detected error in either of the command/address data or the write data will result in a negative error flag indication to memory controller 10'.

Figure 10:
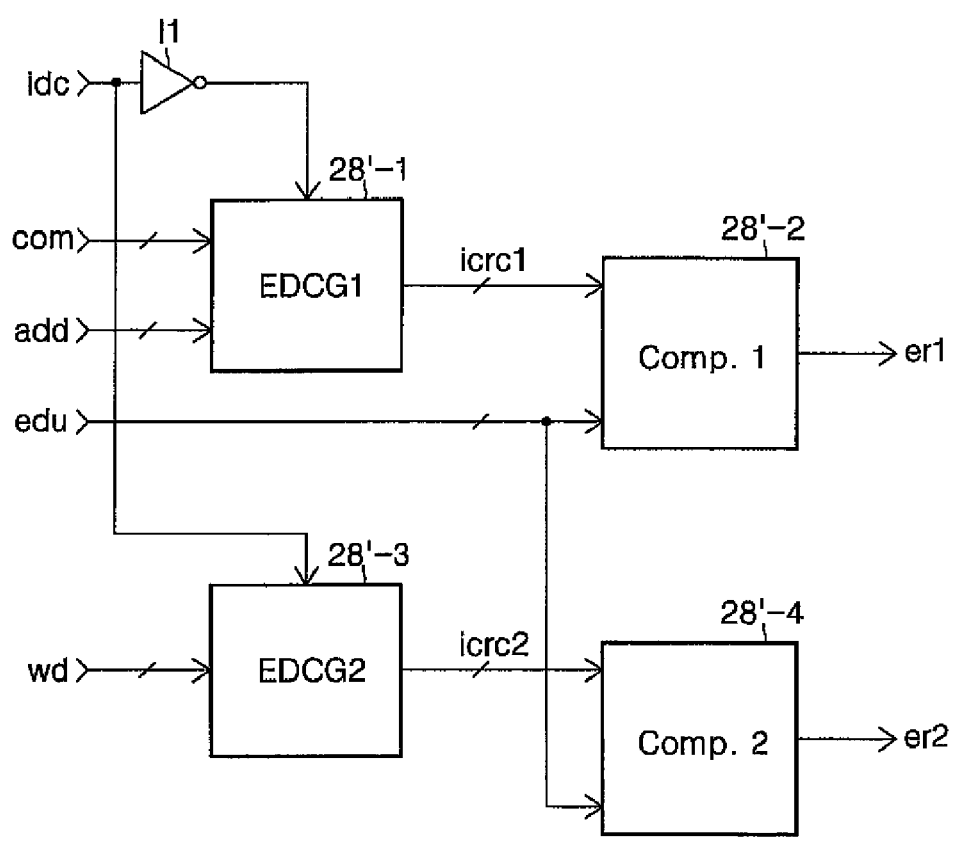
FIG. 10 is a diagram illustrating one exemplary circuit capable of implementing the error detector shown in FIG. 8.

FIG. 10 illustrates one possible circuit implementing error detector 28' of FIG. 8. Here, first and second EDC generators (EDCG1 and EDCG2) receive logically complementary versions of a packet indicating signal (idc) as respective enabling control signals.

First EDC generator 28'-1 may be a conventional EDC generator capable of implementing a CRC algorithm. In the illustrated example, first EDC generator 28'-1 receives both the internal command and the internal address and generates first internal EDC data (icrc) related to the received data. The first internal EDC data (icrc1) is compared to the first EDC data (e.g., CRC data calculated by memory controller 10' in relation to the command/address data and communicated to memory 20' in the first data packet) provided from packet receiver 24' in a conventional comparator circuit 28'-2. A successful comparison of these two results generates a positive (no error) first error signal (er1). An unsuccessful comparison of these two results generates a negative (error) first error signal (er1).

Similarly, second EDC generator 28'-3 receives the internal write data and generates second internal EDC data (icrc2) related to the received write data. The second internal EDC data (icrc2) is compared to the second EDC data (e.g., CRC data calculated by memory controller 10' in relation to the write data and communicated to memory 20' in the second data packet) provided from packet receiver 24' in a conventional comparator circuit 28'-4. A successful comparison of these two results generates a positive (no error) second error signal (er2). An unsuccessful comparison of these two results generates a negative (error) second first error signal (er2).

Figure 11:
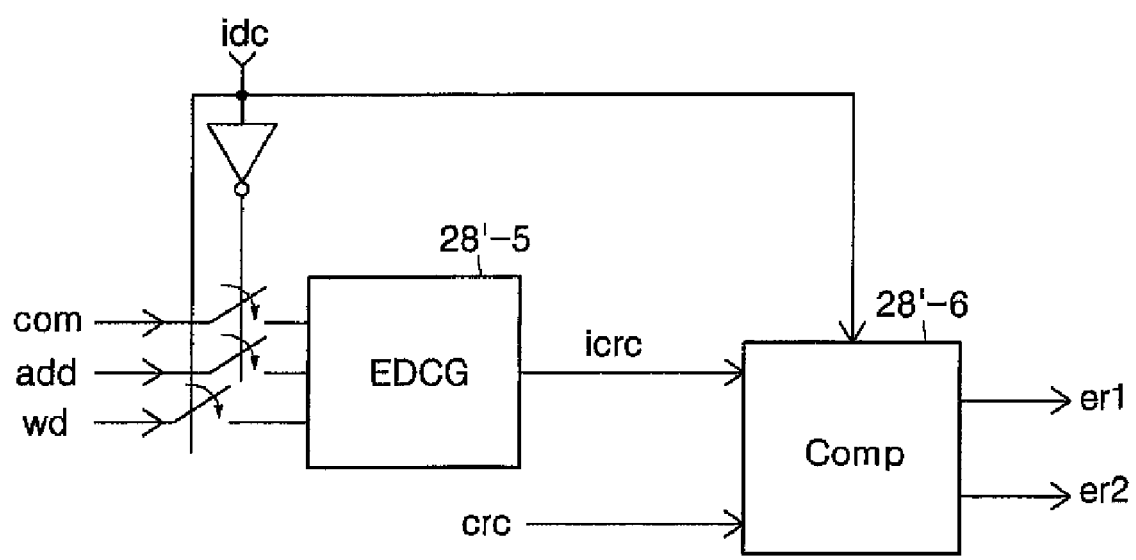
FIG. 11 is a diagram illustrating another exemplary circuit capable of implementing the error detector shown in FIG. 8.

As an alternative to the example of FIG. 10, only a single EDC generator and corresponding comparator need be used to generate both the first and second error signals. This may accomplished by sequentially applying the respective data signals to the EDC generator and thereafter comparing results to a provided EDC reference. FIG. 11 illustrates one possible circuit implanting error detector 28' using a single EDC generator 28'-5 and a single comparator 28'-6. Here, the complementary versions of the packet indicating signal (idc) are used to control switches applying respectively, the internal command (com) and internal address (add) data or the internal write data (wd) to EDC generator 28'-5. The internal EDC data (e.g., icrc) sequentially generated by EDC generator 28'-5 is then compared to an applied EDC reference value (e.g., externally provided CRC data) in order to generate both first and second error signals (er1 and er2).

Up to this point in the description, the exemplary embodiments have assumed a memory capable of being implemented in a single integrated circuit (IC), (e.g., a DRAM, SRAM, or flash memory). However, embodiments of the invention are by no means limited to single IC memory implementations, or implementations where one memory controller is matched with only one unitary memory device.

Figure 12:
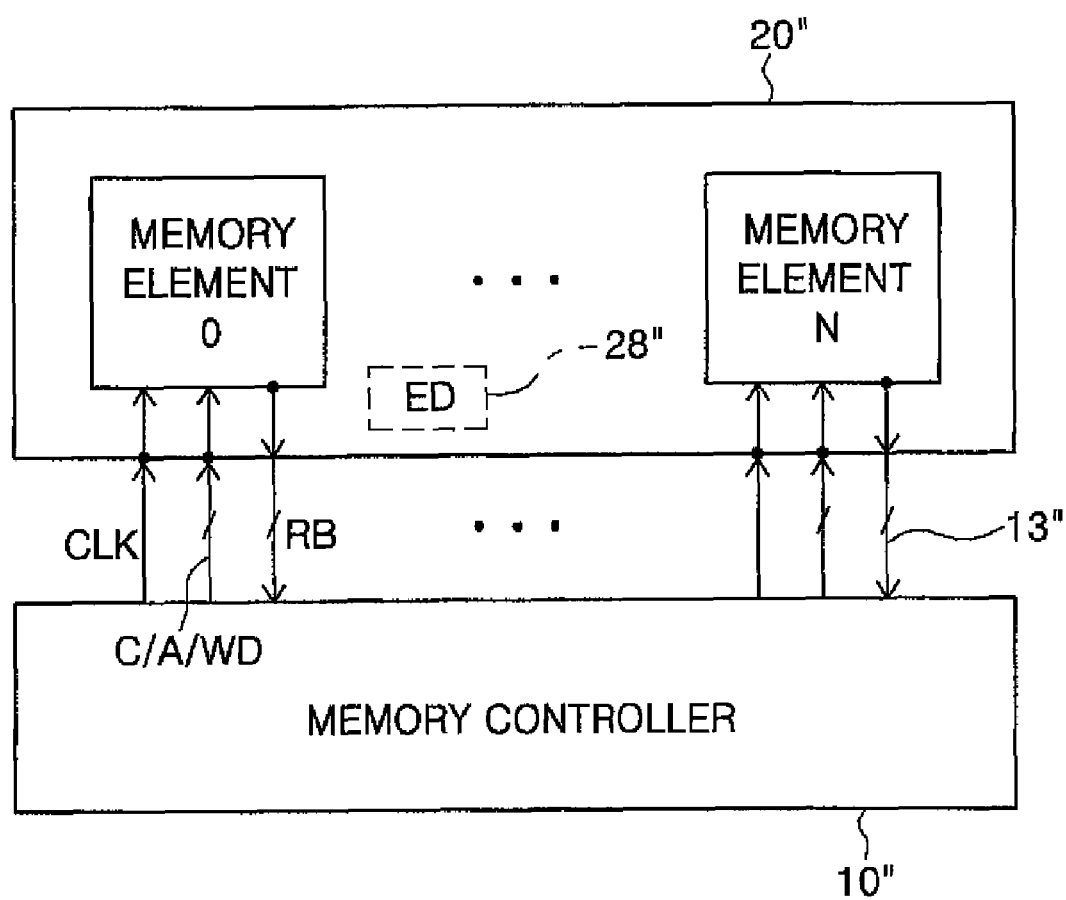
FIG. 12 is a block diagram of a memory system comprising a memory card according to an embodiment of the invention.

As described above, one important driver in the design and implementation of contemporary memory systems is size. The memory system of FIG. 12 comprises a single memory controller 10" arranged with a corresponding memory 20" (e.g., a memory card or similar device) including multiple memory elements 0 through "N". Each memory element may include one or more volatile or nonvolatile memories. For example, in one embodiment, each memory element comprises a vertically stacked arrangement of individual memories.

Memory controller 10" is connected to memory 20" via channel 13" which includes a number of high-speed point-to-point interconnections. Such high-speed point-to-point interconnections are highly susceptible to variances in the length of their constituent signal lines. Thus, extended lateral arrangements of memory elements are difficult to implement. However, vertically stacked arrangements of memory elements allow relatively short point-to-point interconnections between memory controller 10" and memory 20". Further vertical interconnections between stacked memories in each memory element may be configured according to conventionally understood techniques. For example, in one embodiment, a lowermost memory element may route (or re-drive) received packets to other memories in the stack in accordance with a received address. Each memory element may include its own error detector, or a commonly accessed (and potentially more powerful) error detector 28" may be provided on memory 20".

In another embodiment of the invention, a smart card may be implemented as a "memory" associated with a smart card terminal acting as a "memory controller" within the vernacular of the foregoing description. That is, commands communicated from the smart card terminal to the smart card may be handled in a manner consistent with the foregoing embodiments.

Indeed, many products incorporating a memory system potentially benefiting from the incorporation of an EDC capability will be further benefited by the handling of memory system commands according to the dictates of the foregoing teachings.

It should be noted that while the invention has been taught in the context of selected embodiments and detailed examples teaching the making and use of the invention, the invention is not limited to only the disclosed embodiments. Those of ordinary skill in the art will recognize that various modifications and alterations may be made to these embodiments without departing from the scope of the invention as defined by the following claims.

What is claimed is:

1. In a memory system comprising a memory controller and a memory, a method comprising:
   communicating a command and error detection/correction (EDC) data associated with the command from the memory controller to the memory;
   decoding the command and executing an EDC operation related to the EDC data in parallel, wherein decoding the command comprises receiving a command packet in a packet receiver and in response generating an internal command, internal EDC data, and an internal address; and
   if the command is a write command, delaying execution of a write operation indicated by the write command until completion of the EDC operation, else
   immediately executing an operation indicated by the command without regard to completion of the EDC operation,
   wherein executing the EDC operation comprises:
      applying the internal EDC data, the internal command, and the internal address to an error detector;
      generating an error signal in the error detector in relation to the internal command, internal address, and the internal EDC data; and
      applying the error signal to a write enable signal transfer block.

2. The method of claim 1, wherein the command is communicated to the memory as a command packet including control data, as a command packet including control data and address data, or as a command packet including control data, address data, and write data.

3. The method of claim 2, wherein the command is communicated from the memory controller to the memory via a first unidirectional bus.

4. The method of claim 3, wherein the memory communicates read data to the memory controller responsive to the command via a second unidirectional bus.

5. The method of claim 4, wherein the first and second unidirectional buses have different bus widths.

6. The method of claim 2, wherein write data and read data are communicated between the memory controller and memory via a bidirectional bus.

7. The method of claim 1, wherein the command is communicated to the memory as a command packet including the EDC data.

8. The method of 1 wherein the EDC operation implements a cyclic redundancy checker (CRC) and the EDC data comprises CRC data.

9. The method of claim 1, wherein the command communicated from the memory controller to the memory comprises a command packet including the EDC data, control data, and address data and the command is communicated via a first unidirectional bus.

10. The method of claim 1, wherein delaying execution of the write operation comprises; generating a final write enable signal in the write signal transfer block responsive to the error signal.

11. The method of claim 1, further comprising:
    decoding the internal command in a command decoder and generating a plurality of control signals applied to a memory core in order to execute the operation indicated by the command;
    wherein one of the control signals comprises a write enable signal applied to the write signal transfer block.

12. The method of claim 1, further comprising:
    generating an error flag in the memory in response to the error signal and communicating the error flag to the memory controller.

13. The method of claim 1, further comprising at least one of:
    communicating write data associated with the command from the memory controller to the memory via a second unidirectional bus; and
    communicating read data associated with the command from the memory to the memory controller via a third unidirectional bus.

14. The method of claim 13, wherein at least one of the second and third unidirectional buses has a different bus width than the first unidirectional bus.

15. In a memory system comprising a memory controller and a memory, a method comprising:
    communicating a command and error detection/correction (EDC) data associated with the command from the memory controller to the memory, wherein the command communicated from the memory controller to the memory comprises a first command packet including control data, address data, and first EDC data associated with at least one of the control data and address data, and a second command packet including write data and second EDC data associated with the write data,
    decoding the command and executing an EDC operation in parallel, wherein the EDC operation is related to at least one of the first EDC data and the second EDC data, and decoding the command signal comprises receiving the first command packet in a packet receiver and in response generating an internal command, an internal address, first internal EDC data, and a first packet indicating signal; and if the command is a write command, delaying execution of a write operation indicated by the write command until completion of the EDC operation, else immediately executing an operation indicated by the command without regard to completion of the EDC operation, wherein executing the EDC operation comprises:

applying the first internal EDC data, the internal command, the first packet indicating signal, and the internal address to an error detector;

generating a first error signal in the error detector in relation to the internal command, the first EDC data, internal address, and the first packet indicating signal; and applying the first error signal to a write signal transfer block.

16. The method of claim 15, wherein delaying execution of the write operation comprises; generating a final write enable signal in the write signal transfer block in relation to the first error signal.

17. The method of claim 15, wherein decoding the command further comprises;

receiving the second command packet in the packet decoder and generating internal write data, second internal EDC data, and a second packet indicating signal; and storing the internal write data.

18. The method of claim 17, wherein executing the EDC operation further comprises:

applying the second internal EDC data, the internal write data, and the second packet indicating signal to the error detector; and generating a second error signal in the error detector in relation to the internal write data, the second internal EDC data, and the second packet indicating signal.

19. The method of claim 18, further comprising:

applying the second error signal to a data transfer block; and transferring the stored internal write data to a memory cell array via the data transfer block in response to the second error signal.

20. The method of claim 18, further comprising:

generating an error flag in the memory in response to the first and second error signals, and communicating the error flag to the memory controller.

* * * * *